United States Patent [19]

Kan et al.

[11] 3,891,578

[45] June 24, 1975

[54] CARBODIIMIDE-ISOCYANURATE FOAMS CONTAINING URETHANE LINKAGES

[75] Inventors: Peter T. Kan, Plymouth; Moses Cenker, Trenton, both of Mich.

[73] Assignee: BASF Wyandotte Corporation, Wyandotte, Mich.

[22] Filed: Dec. 17, 1973

[21] Appl. No.: 425,270

[52] U.S. Cl.. 260/2.5 AC; 260/2.5 AW; 260/2.5 BF
[51] Int. Cl... C08g 22/36; C08g 22/34; C08g 33/04
[58] Field of Search.... 260/2.5 BF, 2.5 AW, 2.5 AC

[56] References Cited
UNITED STATES PATENTS

| | | | |
|---|---|---|---|
| 3,634,345 | 1/1972 | Diehr et al. | 260/2.5 AW |
| 3,723,366 | 3/1973 | Kan | 260/2.5 BF |
| 3,806,475 | 4/1974 | Narayan et al. | 260/2.5 BF |

FOREIGN PATENTS OR APPLICATIONS

| | | | |
|---|---|---|---|
| 1,223,415 | 2/1971 | United Kingdom | 260/2.5 AW |

*Primary Examiner*—Donald E. Czaja
*Assistant Examiner*—C. Warren Ivy
*Attorney, Agent, or Firm*—Joseph D. Michaels; Bernhard R. Swick; Robert E. Dunn

[57] ABSTRACT

Carbodiimide-isocyanurate foams containing urethane linkages are prepared by mixing a polyisocyanate, a polyol and a catalyst system comprising an s-triazine compound and a catalyst which promotes urethane linkages. The resulting foams are characterized by low friability and good flame resistance.

10 Claims, No Drawings

CARBODIIMIDE-ISOCYANURATE FOAMS CONTAINING URETHANE LINKAGES

BACKGROUND OF THE INVENTION

1. Field Of The Invention

The present invention relates to cellular foam compositions characterized by low friability and good flame resistance. More particularly, the invention relates to carbodiimide-isocyanurate foams containing urethane linkages prepared by mixing a polyisocyanate and a polyol in the presence of certain co-catalyst systems.

2. Prior Art

The preparation of foams containing carbodiimide linkages is well known in the art. Generally, the foams are prepared by condensing an organic polyisocyanate with a catalyst which promotes carbodiimide linkages, optionally in the presence of a blowing agent. Representative of such teachings are the disclosures found in U.S. Pat. Nos. 2,941,966 and 3,645,923. The prior art also teaches that foams containing both carbodiimide and isocyanurate linkages can be prepared by condensing an organic polyisocyanate with a catalyst which promotes both carbodiimide and isocyanurate linkages or with a co-catalyst system, one catalyst promoting carbodiimide linkages and one catalyst promoting isocyanurate linkages. Representative of such teachings are the disclosures found in U.S. Pat. Nos. 3,645,923; 3,657,161; 3,717,596; 3,723,366, and 3,746,709. Carbodiimide foams containing urethane linkages are also known in the art as evidenced by U.S. Pat. No. 3,772,217. Generally, these foams are prepared by either adding a polyol to the organic polyisocyanate at time of mixing for foaming (one-shot process) or using a prepolymer containing pre-formed urethane linkages. There are several inherent disadvantages in either of these processes.

In the one-shot process, there are three reactions, namely, trimerization, carbodiimide and urethane formation occurring almost simultaneously. The trimerization is usually the most rapid one, followed by carbodiimide and urethane formation. All reactions compete for the use of the isocyanate group. As a result, the extent of the slower urethane formation is difficult to predict and, accordingly, the improvement in physical properties of the resulting foams attributable to urethane formation is not uniformly achieved. The prepolymer process eliminates the problem of urethane reaction competing with the other faster reactions; however, the preparation of the prepolymer is often tedious and the stability of the resulting prepolymer is generally poor.

SUMMARY OF THE INVENTION

The present invention relates to an improved process for the preparation of carbodiimide-isocyanurate foams containing urethane linkages employing a catalytically sufficient amount of a catalyst which promotes carbodiimide and isocyanurate linkages and a catalyst which promotes urethane linkages. Upon mixing a polyisocyanate, a polyol and the catalysts, the urethane formation reaction due to the presence of a urethane catalyst is both rapid and exothermic. The heat generated from this reaction then activates the carbodiimide catalyst to cause blowing and foam formation.

DESCRIPTION OF THE PREFERRED EMBODIMENTS

As mentioned above, the co-catalyst system employed in the present invention comprises an s-triazine compound which promotes carbodiimide and isocyanurate linkages and a catalyst which promotes urethane linkages. Representative catalysts which promote carbodiimide and isocyanurate linkages which are of use in the present invention include: 2,4,6-tris(diethanolamino)-s-triazine, 2,4,6-tris(diisopropanolamino)-s-triazine, 2,4,6-tris(N-methylethanolamino)-s-triazine, and unsymmetrically substituted triazines of the formula:

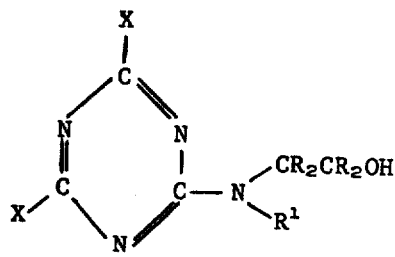

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy atoms, alkyl of from 1 to 12 carbon atoms, phenyl, hydroxyl, halogen, aziridyl, pyrrolidyl, piperidyl, or N-alkylpiperazyl. Since the triazines are unsymmetrically substituted, it is apparent that each X cannot concurrently be

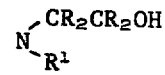

wherein each R and $R^1$ is the same.

Representative compounds from the above generic formula include:
2-amino-4,6-bis(N-methyl-2-hydroxyethylamino)-1,3,5-triazine,
2,4-bis(N-methyl-2-hydroxyethylamino)-6-methoxy-1,3,5-triazine,
2,4-bis(di 2-hydroxyethylamino)-6-chloro-1,3,5-triazine,
2,4-bis(N-methyl-2-hydroxyethylamino)-6-chloro-1,3,5-triazine,
2,4-bis(N-methyl-2-hydroxyethylamino)-6-phenyl-1,3,5-triazine,
2,4-bis(N-methyl-2-hydroxyethylamino)-6-diethylamino-1,3,5-triazine,
2,4-bis(N-methyl-2-hydroxyethylamino)-6-dimethylamino-1,3,5-triazine,
2,4-bis(di-2-hydroxyethylamino)-6-diethylamino-1,3,5-triazine,
2,4-bis(di-2-hydroxyethylamino)-6-phenoxy-1,3,5-triazine,
2,4-bis(N-methyl-2-hydroxyethylamino)-6-phenoxy-1,3,5-triazine,
2,4-bis(N-methyl-2-hydroxyethylamino)-6-methyl-1,3,5-triazine,
2,4-bis(di-2-hydroxyethylamino)-6-methyl-1,3,5-triazine,
2,4-bis(N-methyl-2-hydroxyethylamino)-6-hydroxy-1,3,5-triazine, 2,4-bis(diethylamino)-6-(N-methyl-2-hydroxyethylamino)-1,3,5-triazine, 2,4-dimethoxy-6-(N-methyl-2-hydroxyethylamino)-1,3,5-triazine, 2,4-bis(dimethylamino)-6-(N-methyl-2-hydroxyethylamino)-1,3,5-triazine, 2,4-diphenoxy-6-(N-methyl-2-hydroxyethylamino)-1,3,5-triazine, and 2,4-diphenoxy-6-(di-2-hydroxyethylamino)-1,3,5-triazine.

Generally, the amount of s-triazine catalyst employed in the process of the subject invention will be from 0.1 part to 10 parts per 100 parts of organic polyisocyanate.

The preparation of the triazine catalyst generally comprises condensing cyanuric chloride with the selected amine in the presence of a neutralizing amount of sodium hydroxide. Thus, for example, 2,4,6-tris(diethanolamino)-s-triazine is prepared from the condensation of diethanolamine and cyanuric chloride in the presence of a neutralizing amount of sodium hydroxide. The triazine compounds and their methods of preparation are known in the art and are more fully described by Kaiser et al., *Journal Of The American Chemical Society*, V. 73, p. 2984(1951), as well as in co-pending U.S. Pat. application Ser. No. 319,559 filed Dec. 29, 1972, now U.S. Pat. No. 3,806,475.

The urethane promoting catalysts which may be employed in the present invention are the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. Preferred urethane-promoting catalysts are the tin salts of carboxylic acids such as dibutyltin dilaurate and dibutyltin diacetate. Generally, the amount of the urethane-promoting catalyst employed in the process of the subject invention will be from 0.1 part to 10 parts per 100 parts of organic polyisocyanate.

In accordance with the present invention, rigid cellular foams are prepared by the catalytic condensation of an organic polyisocyanate in the presence of a catalytically sufficient amount of a triazine catalyst and a urethane catalyst as hereinbefore defined.

The products which are produced in accordance herewith are rigid cellular foam plastics containing carbodiimide linkages, isocyanurate linkages and urethane linkages. It is the carbodiimide linkages whose formation provides the carbon dioxide blowing agent and which, together with the isocyanurate linkages, imparts the excellent flame properties to the products.

The organic polyisocyanate used to prepare the carbodiimide foam corresponds to the formula:

$$R''(NCO)_z$$

wherein R'' is a polyvalent organic radical which is either aliphatic, aralkyl, alkaryl, aromatic or mixtures thereof, and $z$ is an integer which corresponds to the valence of R'' and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers". These quasi-prepolymers are prepared by reacting an excess of organic polyisocyanate or mixtures thereof with a minor amount of an active hydrogen containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,-2-bis(4-hydroxyphenyl)propane, commonly known as Bisphenol A.

The hydroxyl-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-terminated polyester with only a portion of the components being a diamine such as ethylene diamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxyl-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as p-aminoaniline, 1,5-diaminonaphthalene, and 2,4-diaminotoluene; aliphatic polyamines such as ethylenediamine, 1,3-propylenediamine, 1,4-butylenediamine, and 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40°C. to 150°C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and in U.S. Pat. application Ser. No. 311,809 filed Dec. 4, 1972 now U.S. Pat. No. 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pats. No. 3,585,185; 3,639,541, and 3,639,542. As is clear from the above, the particular polyol ingredient employed in the preparation of the quasi-prepolymer is not a critical aspect of the present invention. Any compound containing at least two reactive hydrogen atoms may be so used.

Another ingredient in the process of the subject invention is a polyol. Any of the polyols discussed above in connection with the preparation of the quasi-prepolymers may be employed in the process of the subject invention. Generally from 1 part to 100 parts, preferably from 20 parts to 75 parts, of said polyol per 100 parts of organic polyisocyanate will be employed in the process of the subject invention.

It is also possible to employ an isocyanate trimerization catalyst along with the triazine and urethane catalysts of the subject invention. Useful isocyanate trimerization catalysts include, for example, 1,3,5-tris(N,N-dialkylaminoalkyl)-s-hexahydrotriazines; the alkylene oxide and water adducts of 1,3,5-tris(n,n-dialkylaminoalkyl)-s- hexahydrotriazines, 2,4,6 -tris(dimethylaminomethyl)phenol; o-, p- or a mixture of o- and p-dimethylaminomethylphenol, certain organotin compounds and the like.

1,3,5-Tris(n,n-dialkylaminoalkyl)-s-hexahydrotriazine compounds have heretofore been described as useful co-catalysts or isocyanate trimerization catalysts. See U.S. Pat. No. 3,723,366, the disclosure of which is hereby incorporated by reference. Preferred within this group of hexahydrotriazine compounds is 1,3,5-tris-(N,N-dimethyl-3-aminopropyl)-s-hexahydrotriazine.

The alkylene oxide and water adducts of a 1,3,5-tris(N,N-dialkylaminoalkyl)-s-hexahydrotriazine is presumably a quaternary ammonium hydroxide. These compounds are generally prepared by reacting equimolar amounts of the hexahydrotriazine, alkylene oxide and water at a temperature of from about 10°C. to 80°C. for a period of from about 5 minutes to 2 hours. Preferred within this group of compounds is the propylene oxide and water adduct of 1,3,5-tris(N,N-dimethyl-3-aminopropyl)-s-hexahydrotriazine. See U.S. Pat. Nos. 3,746,709 and 3,766,103, the disclosures of which are hereby incorporated by reference.

2,4,6-Tris(dimethylaminomethyl)phenol as well as o-, p- and a mixture of o- and p-(dimethylaminomethyl)phenol are known compounds which are commercially available products sold by Rohm & Haas under the trade names DMP-30 and DMP-10.

The organotin compounds which are useful as isocyanate trimerization compounds are more particularly described in U.S. Pat. No. 3,396,167, the disclosure of which is hereby incorporated by reference. Specifically, the preferred compounds are triorganotin alkoxides or bis(triorganotin) oxide and, in particular, tri-n-butyltin methoxide, bis(tri-n-butyltin) oxide or bis(-triphenyltin) oxide With regard to the phenol-type and organotintype isocyanate trimerization compounds, their use in the preparation of foams is more completely described in U.S. Pat. No. 3,717,596, the disclosure of which is also hereby incorporated by reference. Also useful trimerization catalysts are amines such as triethylene diamine.

The foams of the present invention are prepared by mixing together the organic polyisocyanate, the polyol and the catalyst at an initiating temperature which, depending on the catalyst, will range from about 0°C. to 150°C. Under such conditions, carbon dioxide is generated, foam formation begins, and almost immediately an exotherm is developed within the reaction system. Alternatively, the foams may be prepared by adding the catalyst to the polyisocyanate and the polyol and, when necessary, heating the mixture to the initiation temperature or separately pre-heating the polyisocyanate, the polyol and the catalyst, and then mixing the ingredients.

The present invention also contemplates the incorporation of additional ingredients in the foam formulation to tailor the properties thereof. Thus, plasticizers, such as tris(2-chloroethyl) phosphate; surfactants, such as the silicone surfactants, e.g., alkylpolysiloxanes and polyalkyl siloxanes, may be employed in the invention. Further additional ingredients include auxiliary or supplemental blowing agents, such as water or halohydrocarbons, as described in co-pending U.S. pat. application Ser. No. 169,526, filed Aug. 5, 1971. Also, inorganic fillers, pigments and the like can be used.

It should also be pointed out that in many instances the triazine is a solid at ambient conditions. Thus, it can be first dissolved in the polyol ingredient or other ingredient such as a plasticizer, a surfactant or blowing agent, thereby providing an easy means for introducing the ingredients into the system.

In any event, the carbodiimide foams prepared in accordance herewith are rigid cellular products having a density of from about one pound to forty pounds per cubic foot which exhibit excellent flame properties, such as fire resistance, low smoke evolution and excellent weight retention.

Following are specific, non-limiting examples which are provided to illustrate the enumerated principles described herein. All parts are by weight unless otherwise indicated. In the examples, the compressive strength properties of the foams were determined in accordance with ASTM-1621. The flame retardant properties were determined by the Butler Chimney Test as described by Krueger et al, SPE 25th Antec., Vol. XIII, Detroit, Mich. 1967, pp. 1052–1057.

EXAMPLES 1–31

A series of foams was prepared by simultaneously adding a co-catalyst system to a reaction vessel equipped with a stirrer to which had been charged a polyisocyanate, a polyol and various optional ingredients such as a plasticizer, a surfactant and a blowing agent. An exotherm was generated and foam formation followed soon after. Tables I and II, below, illustrate the details of the preparations, as well as the physical properties of the resulting foams. In all cases, infrared spectroscopic analyses indicate that the foams exhibit carbodiimide, isocyanurate and urethane linkages. In Tables I and II, the following abbreviations are employed:

TDI — a mixture of 80/20 by weight 2,4-, 2,6-tolylene diisocyanate

MDI — methylene diphenyl diisocyanate

Polyol A — propylene oxide adduct of Mannich condensation product of one mole of phenol, diethanolamine and formaldehyde (hydroxyl number of 530)

Polyol B — propylene oxide adduct of tris(diethanolaminomethyl)melamine (hydroxyl number of 578)

TMT — 2,4,6-tris(N-methylethanolamino)-s-triazine

DMT — 2,4-bis(diethylamino)-6-(N-methyl-2-hydroxyethylamino)-s-triazine

TDH — 1,3,5-tris(3-dimethylaminopropyl)-s-hexahydrotriazine

T-12 — dibutyltin dilaurate

TEDA — triethylenediamine

FYROL CEF — tris(2-chloroethyl) phosphate

DC-193 — polysiloxane surfactant

F-11B — fluorotrichloromethane

F-113 — 1,1,2-trichloro-1,2,2-trifluoroethane.

Table I - Foam Preparation

| Example | TDI | MDI | Polyol | TMT | DMT | T-12 | TEDA | TDH | FYROL CEF | DC-193 | F-11B | F-113 | Init. Temp. °C. |
|---|---|---|---|---|---|---|---|---|---|---|---|---|---|
| 1 | 10 | 90 | A, 22 | 8 | — | 3 | 1 | — | 2 | 1 | — | 23 | 15 |
| 2 | 10 | 90 | A, 24 | 6 | — | 2 | — | — | 2 | 1 | — | 20 | 22 |
| 3 | 10 | 90 | A, 28 | 7 | — | 2 | 1 | — | 2 | 1 | — | 15 | 22 |
| 4 | — | 100 | A, 22 | 8 | — | 3 | 1 | — | 2 | 1 | — | 20 | 15 |

Table I - Foam Preparation—Continued

| Example | TDI | MDI | Polyol | TMT | DMT | T-12 | TEDA | TDH | FYROL CEF | DC-193 | F-11B | F-113 | Init. Temp. °C. |
|---|---|---|---|---|---|---|---|---|---|---|---|---|---|
| 5 | — | 100 | A. 22 | 8 | — | 3 | 1 | — | 2 | 1 | 17 | — | 10 |
| 6 | — | 100 | A. 24 | 6 | — | 2 | 1 | — | 2 | 1 | — | 20 | 25 |
| 7 | — | 100 | A. 28 | 7 | — | 1 | 1 | — | 2 | 1.5 | — | 20 | 25 |
| 8 | 10 | 90 | A. 18 | — | 6 | 2 | — | 1 | 2 | 1 | 18 | — | 10 |
| 9 | 10 | 90 | A. 20 | — | 6 | 2 | — | 1 | 2 | 1 | 18 | — | 10 |
| 10 | 10 | 90 | A. 22 | — | 6 | 2 | — | 1 | 2 | 1 | 18 | — | 10 |
| 11 | 10 | 90 | A. 24 | — | 6 | 2 | — | 1 | 2 | 1 | 18 | — | 10 |
| 12 | 10 | 90 | A. 26 | — | 6 | 2 | — | 1 | 2 | 1 | 18 | — | 10 |
| 13 | 10 | 90 | A. 28 | — | 6 | 2 | — | 1 | 2 | 1 | 18 | — | 10 |
| 14 | — | 100 | A. 18 | — | 6 | 2 | — | 1 | 2 | 1 | 18 | — | 10 |
| 15 | — | 100 | A. 20 | — | 6 | 2 | — | 1 | 2 | 1 | 20 | — | 10 |
| 16 | — | 100 | A. 22 | — | 6 | 2 | — | 1 | 2 | 1 | 20 | — | 10 |
| 17 | — | 100 | A. 24 | — | 6 | 2 | — | 1 | 2 | 1 | 20 | — | 10 |
| 18 | — | 100 | A. 26 | — | 6 | 2 | — | 1 | 2 | 1 | 20 | — | 10 |
| 19 | — | 100 | A. 28 | — | 6 | 2 | — | 1 | 2 | 1 | 22 | — | 10 |
| 20 | 10 | 90 | B. 18 | — | 6 | 2 | — | 1 | 2 | 1 | 20 | — | 10 |
| 21 | 10 | 90 | B. 20 | — | 6 | 2 | — | 1 | 2 | 1 | 20 | — | 10 |
| 22 | 10 | 90 | B. 22 | — | 6 | 2 | — | 1 | 2 | 1 | 20 | — | 10 |
| 23 | 10 | 90 | B. 24 | — | 6 | 2 | — | 1 | 2 | 1 | 20 | — | 10 |
| 24 | 10 | 90 | B. 26 | — | 6 | 2 | — | 1 | 2 | 1 | 20 | — | 10 |
| 25 | 10 | 90 | B. 28 | — | 6 | 2 | — | 1 | 2 | 1 | 20 | — | 10 |
| 26 | — | 100 | B. 18 | — | 6 | 2 | — | 1 | 2 | 1 | 20 | — | 10 |
| 27 | — | 100 | B. 20 | — | 6 | 2 | — | 1 | 2 | 1 | 20 | — | 10 |
| 28 | — | 100 | B. 22 | — | 6 | 2 | — | 1 | 2 | 1 | 20 | — | 10 |
| 29 | — | 100 | B. 24 | — | 6 | 2 | — | 1 | 2 | 1 | 20 | — | 10 |
| 30 | — | 100 | B. 26 | — | 6 | 2 | — | 1 | 2 | 1 | 20 | — | 10 |
| 31 | — | 100 | B. 28 | — | 6 | 2 | — | 1 | 2 | 1 | 24 | — | 10 |

Table II

| Foam of Example | Density, pcf. | Compressive Strength at 10% Deflection, psi. | Tumbling Friability % Wt. Loss | Closed Cell Content % | Butler Chimney Test % Weight Retention | Flame Height in. | Time to SX sec. |
|---|---|---|---|---|---|---|---|
| 1 | 1.9 | 22 | 8 | 92 | 58 | 10 | 13 |
| 2 | 2.2 | 31 | 20 | 98 | 79 | 10 | 11 |
| 3 | 2.4 | 38 | 31 | 99 | 77 | 10 | 11 |
| 4 | 2.2 | 30 | 9 | 95 | 59 | 10 | 27 |
| 5 | 2.1 | 26 | 7 | 92 | 66 | 10 | 12 |
| 6 | 2.4 | 45 | 14 | 96 | 85 | 9 | 10 |
| 7 | 2.3 | 40 | 18 | 97 | 81 | 9 | 12 |
| 8 | 1.8 | 19 | 16 | 99 | 85 | 8 | 11 |
| 9 | 1.9 | 23 | 12 | 100 | 86 | 8 | 10 |
| 10 | 1.9 | 23 | 11 | 99 | 86 | 9 | 10 |
| 11 | 1.9 | 19 | 11 | 97 | 85 | 8 | 10 |
| 12 | 2.0 | 22 | 8 | 98 | 82 | 10 | 12 |
| 13 | 2.0 | 19 | 7 | 97 | 75 | 10 | 12 |
| 14 | 1.9 | 22 | 11 | 100 | 86 | 9 | 10 |
| 15 | 1.8 | 22 | 12 | 99 | 83 | 9 | 12 |
| 16 | 1.8 | 22 | 7 | 98 | 83 | 8 | 10 |
| 17 | 1.9 | 19 | 12 | 96 | 83 | 9 | 10 |
| 18 | 1.8 | 20 | 5 | 97 | 74 | 10 | 15 |
| 19 | 1.7 | 17 | 8 | 99 | 71 | 10 | 12 |
| 20 | 1.8 | 12 | 44 | 95 | 84 | 8 | 10 |
| 21 | 1.8 | 12 | 31 | 97 | 78 | 10 | 11 |
| 22 | 1.7 | 12 | 22 | 98 | 68 | 10 | 15 |
| 23 | 1.8 | 14 | 13 | 97 | 75 | 10 | 12 |
| 24 | 1.7 | 13 | 21 | 98 | 72 | 10 | 12 |
| 25 | 1.8 | 14 | 23 | 96 | 65 | 10 | 13 |
| 26 | 1.8 | 11 | 30 | 98 | 80 | 9 | 10 |
| 27 | 1.8 | 10 | 30 | 96 | 81 | 8 | 10 |
| 28 | 1.8 | 13 | 20 | 98 | 84 | 9 | 10 |
| 29 | 1.8 | 15 | 27 | 98 | 81 | 8 | 10 |
| 30 | 1.8 | 14 | 12 | 99 | 69 | 10 | 13 |
| 31 | 1.8 | 14 | 11 | 98 | 72 | 10 | 11 |

EXAMPLES 32–46

A series of foams was prepared following the procedure described in EXAMPLE 1. All formulations included 300 parts of polyphenyl polymethylene polyisocyanate, 6 parts of tris(2-chloroethyl) phosphate and 3 parts of polysiloxane surfactant as well as the other ingredients and amounts thereof set forth in Table III. The polyol (Polyol C) employed was a graft copolymer dispersion prepared by the in situ polymerization of a mixture of styrene and acrylonitrile in a polyether polyl containing approximately 0.3 mole of unsaturation, said polyether polyol having a hydroxyl number of 27 and prepared by the reaction of ethylene oxide with the heteric adduct of propylene oxide, allyl glycidyl ether and glycerol. The initiation temperature was 25°C. The physical properties of the resulting foams are presented in Table III. In all cases, infrared spectroscopic analyses indicate that the foams contain carbodiimide, isocyanurate and urethane linkages.

Table III

| Example | Parts by Weight | | | | | Time, sec. | | | Den. pcf. | Comp. Str. 10% Def. psi. | Tumb. Friab. % Wt. Loss | Closed Cell Cont. % | Butler Chimney Test | | |
|---|---|---|---|---|---|---|---|---|---|---|---|---|---|---|---|
| | Polyol C | T-12 | DMT | TDH | F-11B | Cream | Gel | Tack-Free | | | | | Wt. Ret. % | Flame Ht. in. | Time to SX sec. |
| 32 | 45 | 3 | 18 | 9 | 60 | 6 | 25 | 40 | 2.1 | 21.6 | 65 | 100 | 93 | 4 | 10 |
| 33 | 45 | 2.7 | 18 | 9 | 60 | 8 | 30 | 60 | 2.1 | 21.6 | 63 | 100 | 93 | 5 | 10 |
| 34 | 45 | 3 | 18 | 8.1 | 60 | 8 | 35 | 60 | 2.1 | 22.2 | 66 | 102 | 92 | 6 | 10 |
| 35 | 45 | 3 | 15 | 9 | 60 | 10 | 35 | 60 | 2.1 | 20.9 | 67 | 102 | 95 | 6 | 10 |
| 36 | 45 | 2.7 | 18 | 9 | 66 | 8 | 30 | 65 | 1.8 | 14.9 | 77 | 101 | 92 | 6 | 10 |
| 37 | 45 | 3 | 18 | 8.1 | 72 | 8 | 30 | 65 | 1.8 | — | 83 | 101 | 93 | 5 | 10 |
| 38 | 45 | 3 | 15 | 9 | 66 | 8 | 35 | 70 | 1.9 | 16.9 | 67 | 102 | 92 | 5 | 10 |
| 39 | 60 | 3 | 15 | 9 | 60 | 6 | 30 | 55 | 2.2 | 19.7 | 64 | 100 | 93 | 7 | 10 |
| 40 | 60 | 3 | 15 | 12 | 60 | 5 | 30 | 50 | 2.0 | 16.2 | 60 | 100 | 92 | 7 | 10 |
| 41 | 60 | 3 | 15 | 15 | 60 | 4 | 30 | 40 | 2.0 | 16.2 | 67 | 100 | 92 | 7 | 10 |
| 42 | 60 | 3 | 18 | 12 | 66 | 6 | 35 | 50 | 1.9 | 17.2 | 69 | 100 | 94 | 5 | 10 |
| 43 | 60 | 3 | 18 | 15 | 66 | 5 | 35 | 45 | 2.1 | 20.0 | 69 | 100 | 91 | 7 | 10 |
| 44 | 75 | 3 | 18 | 15 | 72 | 5 | 35 | 50 | 1.9 | 17.8 | 65 | 99 | 90 | 7 | 10 |
| 45 | 75 | 3 | 18 | 18 | 72 | 5 | 30 | 50 | 1.9 | 14.7 | 63 | 99 | 91 | 8 | 10 |
| 46 | 75 | 6 | 18 | 9 | 72 | 5 | 30 | 60 | 1.9 | 16.7 | 59 | 99 | 91 | 7 | 10 |

EXAMPLES 47–72

A series of foam was prepared in the manner described in Example 1. In all cases, 300 parts of polymethylene polyphenylisocyanate, 6 parts of tris(2-chloroethyl) phosphate and 3 parts of siloxane surfactant was employed. The particular polyol and catalysts employed, as well as amounts thereof, are presented in Table IV, below. In all cases, the initiation temperature was 25°C. and infrared spectroscopic analyses indicate that the foams exhibit carbodiimide, isocyanurate and urethane linkages. The abbreviations DMT, TDH and F-11B are described above. The following new abbreviations are used in Table IV:

DBTDA — dibutyltin diacetate
DMP-10 — mixture of o- and p-(dimethylaminomethyl)phenol
Polyol D — ethylene oxide adduct of Bisphenol A, hydroxyl number of approximately 220
Polyol E — a 500 molecular weight propylene oxide adduct of Bisphenol A, hydroxyl number of approximately 220
Polyol F — a 985 molecular weight ester-containing polyol prepared by the reaction of 12 moles of propylene oxide with the equimolar reaction product of tetrabromophthalic anhydride and a 400 molecular weight propylene oxide adduct of pentaerythritol
Polyol G — a 1500 molecular weight polyol prepared by the reaction of propylene oxide with glycerol
Polyol H — a 1050 molecular weight polypropylene glycol
Polyol I — a 4500 molecular weight polyol prepared by capping with ethylene oxide a propylene oxide adduct of trimethylolpropane, said polyol having an ethylene oxide content of 9%
Polyol J — a 730 molecular weight propylene oxide adduct of trimethylolpropane
Polyol K — a 1500 molecular weight polyol prepared by capping with ethylene oxide a propylene oxide adduct of glycerol, said polyol having an ethylene oxide content of approximately 67% by weight
Polyol L — a 1000 molecular weight polyol prepared by capping with ethylene oxide a propylene oxide adduct of propylene glycol, said adduct having an ethylene oxide content of 67% by weight.

Table IV

| Ex. | Polyol | DMT | TDH | DBTDA | T-12 | DMP-10 | F11B | Time, sec. | | | Den. pcf. | Comp. Str. 10% Def. psi. | Tumb. Friab. % Wt. Loss | Closed Cell Cont. % | Butler Chimney Test | | |
|---|---|---|---|---|---|---|---|---|---|---|---|---|---|---|---|---|---|
| | | | | | | | | Cream | Gel | Tack Free | | | | | Wt. Ret. % | Flame Ht. in. | Time to SX sec. |
| 47 | 45 D | 6 | 3 | 3 | — | — | 60 | 4 | 27 | 81 | 1.9 | 21.0 | 35 | 115 | 93 | 5 | 10 |
| 48 | 45 D | 33 | 3 | 3 | — | — | 60 | 4 | 21 | 110 | 1.8 | 19.2 | 51 | 107 | 90 | 6 | 10 |
| 49 | 45 E | 6 | 3 | 2.1 | — | — | 60 | 10 | 40 | 110 | 1.7 | 17.0 | 24 | 95 | 91 | 6 | 10 |
| 50 | 60 E | 6 | 3 | 3 | — | — | 66 | 9 | 34 | 130 | 1.7 | 13.4 | 23 | 96 | 90 | 6 | 10 |
| 51 | 75 E | 6 | 3 | 2.1 | — | — | 66 | 8 | 35 | 125 | 1.6 | 17.0 | 15 | 98 | 92 | 6 | 10 |
| 52 | 15 F / 30 A | 12 | 1.5 | — | 0.9 | 18 | 60 | 5 | 50 | 63 | 1.7 | 17.0 | 44 | 96 | 84 | 8 | 10 |
| 53 | 20 F / 40 A | 6 | 1.5 | — | 0.6 | 12 | 60 | 5 | 42 | 50 | 2.0 | 20.0 | 22 | 95 | 83 | 10 | 10 |
| 54 | 60 F / 30 A | 6 | 1.5 | — | 0.3 | 12 | 60 | 6 | 38 | 44 | 2.3 | 28.8 | 13 | 94 | 85 | 9 | 10 |
| 55 | 45 G | 9 | 6 | 0.9 | — | — | 60 | 12 | 55 | 135 | 1.9 | 22.0 | 57 | 98 | 90 | 4 | 10 |
| 56 | 60 G | 9 | 6 | 0.9 | — | — | 66 | 12 | 50 | 125 | 1.9 | 21 | 51 | 98 | 91 | 5 | 10 |
| 57 | 75 G | 9 | 4.5 | 0.9 | — | — | 72 | 14 | 55 | 225 | 2.0 | 16 | 62 | 99 | 91 | 7 | 10 |
| 58 | 45 H | 9 | 6 | 0.9 | — | — | 60 | 12 | 55 | 160 | 1.9 | 21 | 63 | 100 | 94 | 5 | 10 |
| 59 | 60 H | 9 | 4.5 | 0.9 | — | — | 66 | 13 | 60 | 225 | 1.8 | 17 | 67 | 100 | 96 | 4 | 10 |
| 60 | 75 H | 9 | 4.5 | 0.9 | — | — | 72 | 13 | 60 | 230 | 1.8 | 15 | 66 | 97 | 90 | 6 | 10 |
| 61 | 45 I | 9 | 12 | 1.2 | — | — | 66 | 9 | 45 | 75 | 1.9 | 18 | 60 | 97 | 86 | 6 | 13 |
| 62 | 60 I | 9 | 9 | 0.9 | — | — | 72 | 15 | 65 | 120 | 1.8 | 16 | 65 | 96 | 89 | 8 | 10 |
| 63 | 75 I | 9 | 9 | 0.6 | — | — | 78 | 14 | 70 | 150 | 1.8 | 14 | 60 | 102 | 86 | 9 | 11 |
| 64 | 45 J | 9 | 6 | 0.6 | — | — | 66 | 15 | 55 | 180 | 1.7 | 20 | 47 | 108 | 84 | 6 | 10 |

Table IV — Continued

| Ex. | Polyol | DMT | TDH | DBTDA | T-12 | DMP-10 | F11B | Time. sec. Cream | Gel | Tack Free | Den. pcf. | Comp. Str. 10% Defl. psi. | Tumb. Friab. % Wt. Loss | Closed Cell Cont. % | Butler Chimney Test Wt. Ret. % | Flame Ht. in. | Time to SX sec. |
|---|---|---|---|---|---|---|---|---|---|---|---|---|---|---|---|---|---|
| 65 | 60 J | 9 | 6 | 0.3 | — | — | 66 | 15 | 50 | 180 | 1.8 | 20 | 42 | 113 | 90 | 10 | 11 |
| 66 | 75 J | 9 | 6 | 0.3 | — | — | 72 | 15 | 55 | 185 | 1.8 | 18 | 38 | 110 | 86 | 8 | 10 |
| 67 | 45 K | 6 | 4.5 | 0.3 | — | — | 60 | 24 | 55 | 130 | 2.0 | 21 | 68 | 96 | 95 | 4 | 10 |
| 68 | 60 K | 6 | 3 | 0.3 | — | — | 66 | 19 | 70 | 220 | 1.9 | 24 | 53 | 111 | 94 | 4 | 10 |
| 69 | 75 K | 6 | 3 | 0.3 | — | — | 72 | 9 | 60 | 240 | 1.8 | 17 | 46 | 103 | 94 | 4 | 10 |
| 70 | 45 L | 3 | 9 | 0.3 | — | — | 60 | 18 | 47 | 140 | 2.0 | 22 | 57 | 102 | 94 | 4 | 10 |
| 71 | 60 L | 3 | 6 | 0.3 | — | — | 66 | 7 | 46 | 200 | 2.0 | 18 | 44 | 97 | 93 | 6 | 10 |
| 72 | 75 L | 3 | 4.5 | 0.3 | — | — | 72 | 8 | 50 | 260 | 1.9 | 14 | 52 | 99 | 93 | 5 | 10 |

EXAMPLES 73–96

A series of foams was prepared employing various metal and organometallic salts of carboxylic acids. The initiation temperature was 10°C. and each formulation contained in addition to that illustrated in Table V two parts of DMT, one part of TDH and one part of siloxane surfactant. In the Table, Pb-Oct. stands for lead octoate. All other abbreviations are as defined above.

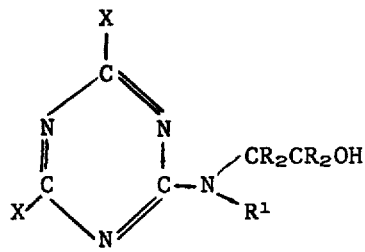

Table V

| Example | PAPI | TDI | Polyol A | T-12 | T-9 | Pb-Oct. | DBT-DA | F-11B | Cream | Gel | Tack Free | Den. pcf. | Comp. Str. 10% Defl. psi. | Tumbl. Friab. % Wt. Loss | Closed Cell Cont. % | Wt. Ret. % | Flame Ht. in. | Time to SK sec. |
|---|---|---|---|---|---|---|---|---|---|---|---|---|---|---|---|---|---|---|
| 73 | 90 | 10 | 10 | 2 | — | — | — | 16 | 7 | 20 | 65 | 2.0 | 34.4 | 45 | 102 | 94 | 9 | 10 |
| 74 | 90 | 10 | 10 | — | 2 | — | — | 16 | 4 | 90 | 120 | 1.9 | 25.0 | 85 | 99 | 89 | 10 | 10 |
| 75 | 90 | 10 | 10 | — | — | 2 | — | 16 | 4 | 35 | 105 | 2.0 | 28.9 | 73 | 101 | 90 | 9 | 10 |
| 76 | 90 | 10 | 10 | — | — | — | 2 | 16 | 7 | 30 | 65 | 1.9 | 27.3 | 52 | 100 | 85 | 10 | 10 |
| 77 | 90 | 10 | 15 | 2 | — | — | — | 13 | 4 | 12 | 30 | 2.3 | 45.3 | 21 | 103 | 93 | 9 | 10 |
| 78 | 90 | 10 | 15 | — | 2 | — | — | 16 | 3 | 20 | 30 | 1.9 | 25.5 | 41 | 100 | 77 | 9 | 11 |
| 79 | 90 | 10 | 15 | — | — | 2 | — | 16 | 3 | 16 | 35 | 2.0 | 26.4 | 44 | 100 | 85 | 10 | 10 |
| 80 | 90 | 10 | 15 | — | — | — | 2 | 16 | 5 | 18 | 25 | 1.9 | 30.6 | 25 | 100 | 78 | 10 | 11 |
| 81 | 90 | 10 | 20 | 2 | — | — | — | 16 | 3 | 6 | 15 | 2.2 | 40.7 | 14 | 102 | 84 | 9 | 11 |
| 82 | 90 | 10 | 20 | — | 2 | — | — | 16 | 3 | 10 | 10 | 2.0 | 45.6 | 15 | 101 | 85 | 9 | 10 |
| 83 | 90 | 10 | 20 | — | — | 2 | — | 16 | 3 | 12 | 35 | 2.1 | 29.0 | 25 | 100 | 81 | 10 | 11 |
| 84 | 90 | 10 | 20 | — | — | — | 2 | 16 | 5 | 14 | 25 | 1.9 | 32.4 | 17 | 101 | 71 | 11 | 13 |
| 85 | 100 | 0 | 10 | 2 | — | — | — | 18 | 5 | 30 | 90 | 1.9 | 23.6 | 50 | 102 | 84 | 10 | 10 |
| 86 | 100 | 0 | 10 | — | 2 | — | — | 16 | 4 | 90 | 120 | 1.9 | 23.5 | 81 | 99 | 78 | 10 | 12 |
| 87 | 100 | 0 | 10 | — | — | 2 | — | 18 | 4 | 45 | 90 | 2.0 | 20.1 | 78 | 101 | 89 | 10 | 10 |
| 88 | 100 | 0 | 10 | — | — | — | 2 | 16 | 6 | 35 | 55 | 2.0 | 30.5 | 42 | 101 | 86 | 10 | 10 |
| 89 | 100 | 0 | 15 | 2 | — | — | — | 16 | 4 | 12 | 30 | 2.1 | 25.3 | 20 | 99 | 86 | 10 | 11 |
| 90 | 100 | 0 | 15 | — | 2 | — | — | 16 | 4 | 25 | 25 | 2.0 | 30.3 | 32 | 100 | 76 | 11 | 10 |
| 91 | 100 | 0 | 15 | — | — | 2 | — | 18 | 4 | 25 | 45 | 2.0 | 25.9 | 43 | 101 | 84 | 10 | 10 |
| 92 | 100 | 0 | 15 | — | — | — | 2 | 16 | 5 | 25 | 30 | 2.1 | 38.9 | 23 | 100 | 92 | 8 | 10 |
| 93 | 100 | 0 | 20 | 2 | — | — | — | 16 | 4 | 8 | 15 | 2.2 | 38.4 | 12 | 102 | 79 | 10 | 12 |
| 94 | 100 | 0 | 20 | — | 2 | — | — | 18 | 3 | 10 | 15 | 1.9 | 36.8 | 15 | 100 | 71 | 11 | 12 |
| 95 | 100 | 0 | 20 | — | — | 2 | — | 18 | 3 | 20 | 45 | 1.9 | 32.2 | 20 | 101 | 77 | 11 | 11 |
| 96 | 100 | 0 | 20 | — | — | — | 2 | 16 | 4 | 20 | 25 | 2.1 | 39.7 | 13 | 99 | 80 | 11 | 12 |

The embodiments of the invention in which an exclusive property or privilege is claimed are defined as follows:

1. A process for the preparation of a cellular foam characterized by carbodiimide-isocyanurate-urethane linkages which comprises reacting an organic polyisocyanate and a polyol in the presence of a catalytically sufficient amount of a catalyst system comprising a. an s-triazine compound selected from the group consisting of 2,4,6-tris(diethanolamino)-s-triazine, 2,4,6-tris(diisopropanolamino)-s-triazine, 2,4,6-tris(dibutanolamino)-s-triazine, 2,4,6-tris(N-methylethanolamino)-s-triazine, and unsymmetrically substituted triazines of the formula:

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy atoms, alkyl of from 1 to 12 carbon atoms, phenyl, hydroxyl, halogen, aziridyl, pyrrolidyl, piperidyl, or N-alkylpiperazyl, and b. a compound which promotes urethane linkages.

2. The process of claim 1 wherein the organic polyisocyanate is selected from the group consisting of toluene diisocyanate, methylene diphenyl diisocyanate, polyphenyl polymethylene polyisocyanate and mixtures thereof.

3. The process of claim 1 wherein the polyol is an alkylene oxide condensate of an organic compound having from 2 to 6 reactive hydrogen atoms.

4. The process of claim 1 wherein the s-triazine compound is 2,4,6-tris(diethanolamino)-s-triazine.

5. The process of claim 1 wherein the s-triazine compound is 2,4-bis(diethylamino)-6-(N-methyl-2-hydroxyethylamino)-s-triazine.

6. The process of claim 1 wherein the compound which promotes urethane linkages is dibutyltin dilaurate.

7. The process of claim 1 wherein the compound which promotes urethane linkages is dibutyltin diacetate.

8. The process of claim 1 conducted in the presence of a fluorocarbon blowing agent.

9. The process of claim 1 conducted in the presence of tris(2-chloroethyl) phosphate.

10. The process of claim 1 conducted in the presence of 1,3,5-tris(3-dimethylaminopropyl)-s-hexahydrotriazine.

* * * * *